Oct. 30, 1956 W. J. ADAMS, JR 2,768,453
ROTARY SNOW PLOW
Filed Jan. 16, 1953 4 Sheets-Sheet 1
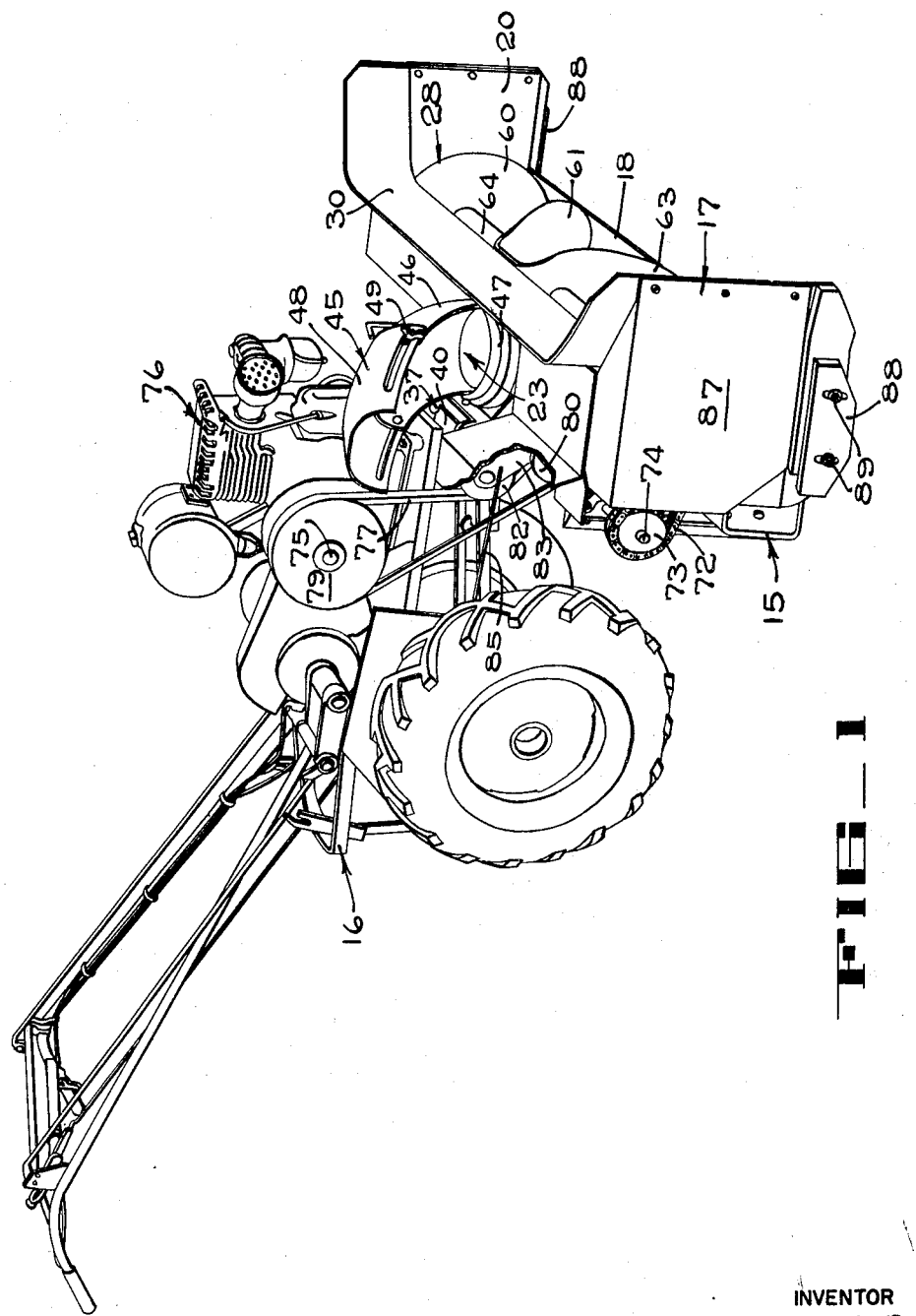
FIG_1
INVENTOR
WILLIAM J. ADAMS, JR.
BY *Hans G. Hoffmeister*
ATTORNEY Oct. 30, 1956 W. J. ADAMS, JR 2,768,453
ROTARY SNOW PLOW
Filed Jan. 16, 1953 4 Sheets-Sheet 2
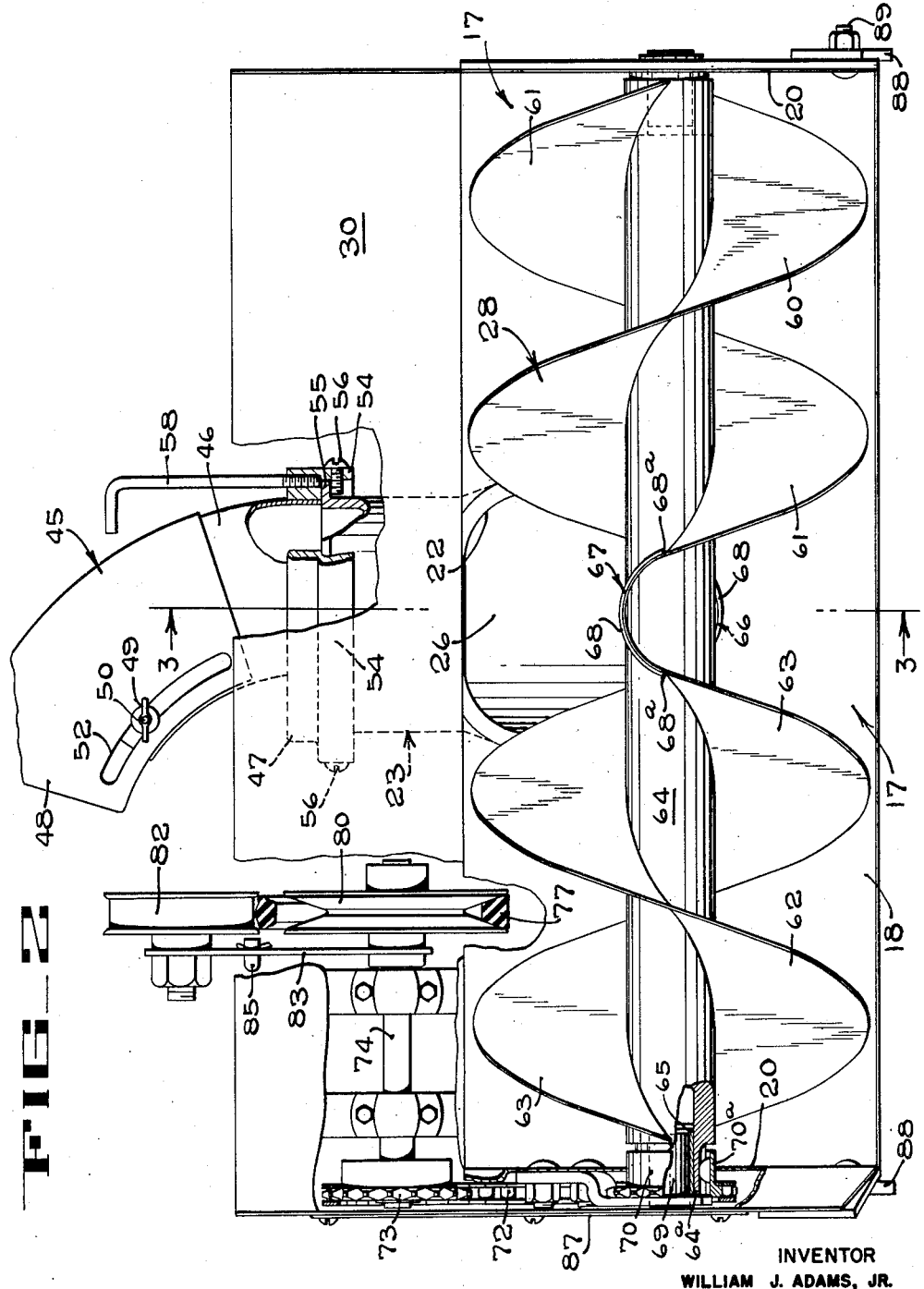
INVENTOR
WILLIAM J. ADAMS, JR.
BY
ATTORNEY Oct. 30, 1956 W. J. ADAMS, JR 2,768,453
ROTARY SNOW PLOW Filed Jan. 16, 1953 4 Sheets-Sheet 3

FIG_5

FIG_4

FIG_3

INVENTOR
WILLIAM J. ADAMS, JR.

BY *Hans G. Hoffmeister*
ATTORNEY

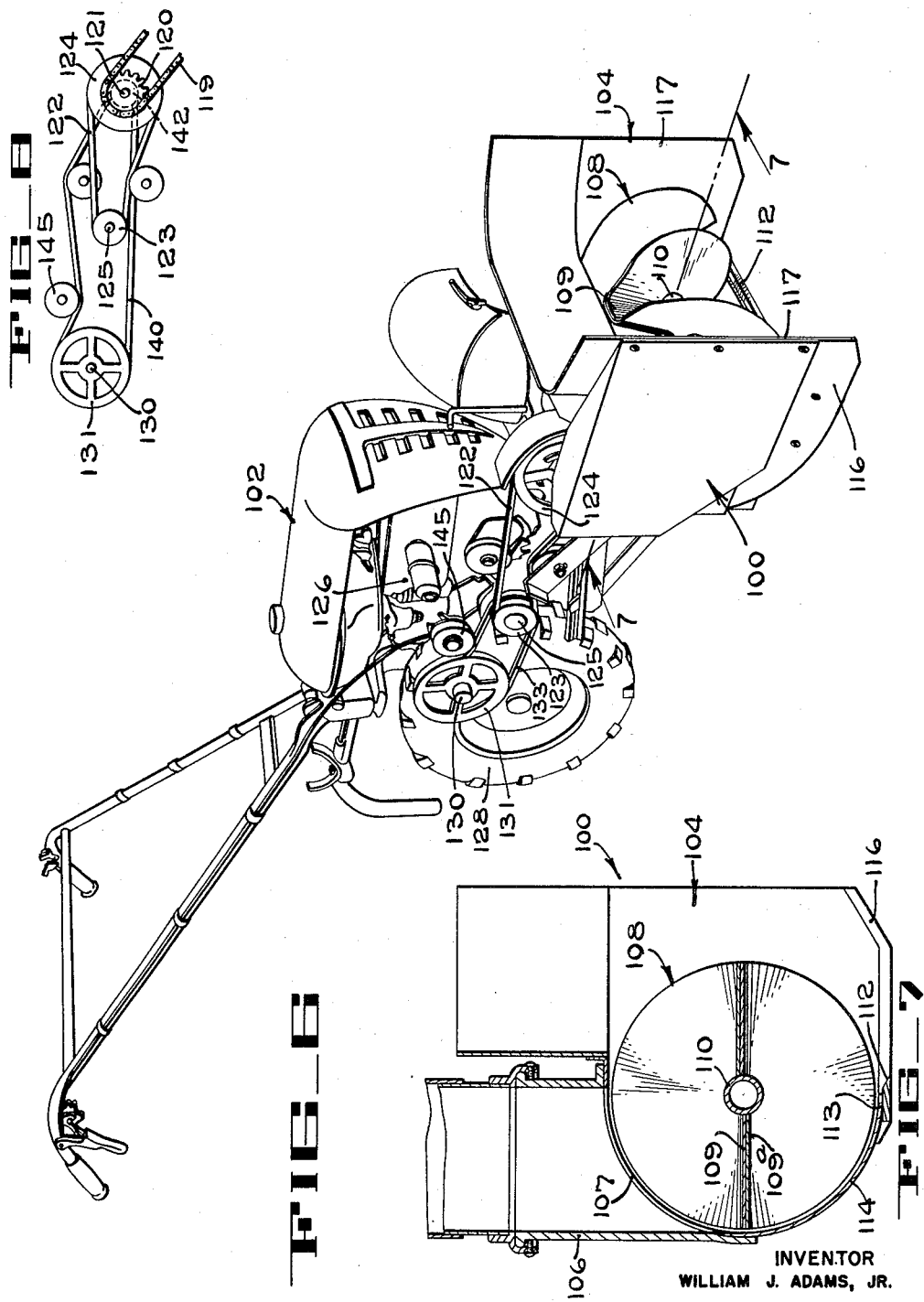

United States Patent Office 2,768,453
Patented Oct. 30, 1956

2,768,453

ROTARY SNOW PLOW

William J. Adams, Jr., Grafton, Wis., assignor to Food Machinery and Chemical Corporation, San Jose, Calif., a corporation of Delaware Application January 16, 1953, Serial No. 331,599

2 Claims. (Cl. 37—43)

This invention appertains to snow plows. More particularly it relates to a rotary snow plow attachment for a power driven vehicle such as a garden tractor.

It is an object of the present invention to provide an efficient rotor for a rotary snow plow for performing the dual function of moving snow to a discharge chute and positively ejecting it therethrough.

Another object is to provide an improved discharge chute for a snow plow.

A further object is to provide a snow plow that is simple in construction and efficient in operation.

Other and further objects and advantages of the present invention will be apparent from the following description and the accompanying drawings, wherein:

Fig. 1 is a perspective view of a snow plow attachment constructed according to the teaching of the present invention and shown mounted on a two-wheel garden tractor.

Fig. 2 is a front elevation of the snow plow attachment of Fig. 1.

Fig. 3 is a fragmentary vertical section taken on line 3—3 of Fig. 2.

Fig. 4 is an enlarged side elevation of the snow plow attachment of Fig. 1, with parts broken away to more clearly disclose the drive mechanism.

Fig. 5 is a fragmentary plan view of a portion of the mechanism of Fig. 4, taken on line 5—5 of Fig. 4.

Fig. 6 is a perspective view of a modified form of the snow plow attachment of the present invention shown mounted on a small, one-wheeled tractor.

Fig. 7 is a fragmentary vertical section taken on line 7—7 of Fig. 6.

Fig. 8 is a schematic view of the drive mechanism used in the snow plow attachment illustrated in Fig. 6.

In Fig. 1, the reference numeral 15 indicates generally a rotary snow plow attachment arranged to be attached to and driven from a two-wheeled garden tractor 16. The attachment 15 has a housing 17 comprising an elongated, U-shaped, forwardly opening, scoop 18 (Fig. 3) extending longitudinally between a pair of spaced side plates 20, (Fig. 2) which are welded to the end faces of the scoop. The scoop has a semi-cylindrical rear portion 19 (Fig. 3) in which a discharge opening 22 is provided substantially midway between the side plates 20. This discharge opening 22 (Fig. 3) includes practically the entire upper half of the semi-circle defined by the rear wall 19 of the scoop. A generally cylindrical outlet duct 23, which is mounted in an upright position on the scoop 18, has a flange 24 extending around the discharge opening 22 and secured to the scoop by machine screws (not shown). It is to be noted that the vertical rear wall 26 of the duct 23 is substantially tangent to the circle defined by the rear wall of the scoop while the front wall 27 of the duct is disposed slightly forwardly of a vertical plane through the axis of rotation of a screw-type rotor 28 disposed in the housing 17. With this arrangement, the snow gathered by the screw-type rotor 28, in a manner to be described presently, is translated along the rear wall 18a below the opening 22 with a smooth, uninterrupted, upward movement into the outlet duct 23.

The housing 17 of the snow plow attachment is also provided with a forward, upper, vertical wall member 30 (Fig. 1) that is secured, as by welding, to the top surfaces of the side plates 20 and to an upwardly extending flange 31 (Fig. 3) of the scoop 18. A rear structural channel member 33 extends transversely across the housing, being welded to the rear wall 19 of the scoop 18. A pair of spaced, vertical support plates 35 (Fig. 4) are secured to the rear face of the channel 33 and extend rearwardly and upwardly into supporting engagement with a snap hitch 37. The snow plow attachment 15 is mechanically connected to the tractor 16 through the hitch 37 which comprises a base plate 38 (Fig. 5) to which two spaced upstanding side walls 39 are secured. Each side wall 39 has a notched forward end portion 39a (Fig. 4) which is adapted to receive the forward edge of a support plate 40 of the tractor chassis. The rear edge of the support plate 40 is engaged in a latch detent 41 on a spring loaded latch arm 42. The manner of mounting the snow plow attachment on the power unit is not a part of the present invention, it being understood that any suitable coupling or hitch may be used for this purpose.

A directional discharge hood 45 (Fig. 2) is mounted on the outlet duct 23. The hood 45 includes an elbow 46, riveted to a swivel collar 47, and a curved extension cap 48 adjustably secured to the elbow 46 by two wing nuts 49 which engage bolts 50 extending through holes in the elbow 46 and arcuate slots 52 in the cap 48. By adjusting the cap 48 relative to the elbow 46 the angle of discharge of the snow may be varied. To permit the direction of discharge to be varied, the swivel collar is mounted for rotary adjustment in a horizontal plane on the outlet duct 23. The swivel collar 47 has a skirt portion 54 extending downwardly over a flange 55 on the upper end of the duct 23. A plurality of machine screws 56 are threaded through tapped openings in the skirt 54 to project into position below the flange 55. A locking screw 58 is threaded through a tapped opening in the swivel collar into engagement with the top surface of the flange 55. As the locking screw 58 is threaded downwardly through the collar, the collar is moved upwardly bringing the screws 56 into frictional locking engagement with the lower surface of the flange 55 to hold the collar and the attached hood 45 in adjusted position.

The rotor 28 (Fig. 2) comprises two right hand helical flights 60 and 61 and two left hand helical flights 62 and 63 wound on a tubular shaft 64. The flights of each hand are disposed 180° out of phase with each other. However, the right hand flight 60 is in phase with the left hand flight 62, and the flight 61 is in phase with the flight 63. At their axially inner ends the flights 60 and 62 are joined by a curved snow ejector bucket portion 66 and the flights 61 and 63 are joined by a similar curved bucket portion 67. Each bucket is substantially U-shaped and has a base section 68 (Fig. 3) that is substantially tangent to the shaft 64. On each side of the base section 68, the bucket extends in a curved path (Fig. 2) in a plane normal to the axis of the shaft 64 to a point 68a where the bucket is blended into the adjacent helical blade.

It is to be particularly noted that the rear semi-circular wall of the scoop 18 is concentric with the circular path defined by the outer edges of the flights and that the wall is disposed close to these outer edges. Thus, snow may be translated rearwardly and upwardly along the curved wall of the scoop by the rapidly rotating flights and ejected from the bucket portions 67 in a straight line discharge path into said duct 23.

The tubular shaft 64 is journalled for rotation at each end in a bearing sleeve 65 (Fig. 2) mounted on a stub shaft 69 which is supported in stationary position from the adjacent end plate 20. At one end the tubular shaft 64 has a reduced diameter portion 64a which extends a short distance past the side plate 20 where it is keyed to the hub 70a of a sprocket 70. The rotor shaft 64 is driven by means of a chain 72 which is trained over the sprocket 70 and over a sprocket 73 that is keyed to a countershaft 74. As best seen in Fig. 4, the countershaft 74 is driven from a power take-off shaft 75 of the engine 76 of the tractor 16 through a belt 77 which is trained over a pulley 79 keyed to the take-off shaft 75 and a pulley 80 keyed to the countershaft 74. A friction driving connection is established between the belt 77 and the pulleys 79 and 80 by an idler pulley 82 rotatably secured on a lever 83 which is pivotally mounted on the countershaft 74. A control rod 85, which may be conveniently manipulated by the operator, is pivotally connected at one end to the lever 83. When the lever 83 is pivoted in a counterclockwise direction, the idler pulley 82 presses the belt 77 into engagement with the pulleys 79 and 80. A sheet metal cover 87 is secured over the chain 72 and the sprocket 70.

A wear shoe 88 is adjustably secured by bolts 89 to each side plate 20 to permit raising or lowering of the scoop, dependent upon the smoothness of the surface to be plowed.

In operation, when the scoop 18 is moved into a layer or pile of snow, each of the right and left hand screws shave off a slice of snow during each revolution and transfer this snow axially inwardly toward the center of the scoop where it is engaged by the bucket portions 66 and 67 of the rotor and positively ejected into the outlet duct 23. Since the diameter of the outlet duct 23 is greater than the effective radial extent of buckets 66 and 67 and since the generally square discharge opening 22 is wider than the bucket, as seen in Fig. 2, it will be evident that, when each bucket reaches the horizontal discharge position indicated by the reference line 90 in Fig. 3, the discharge opening 22 immediately thereabove will be large enough to receive the entire discharge of the bucket. There are no overhanging ledges which might intercept the snow and cause jamming and packing at this critical zone. With this arrangement, full advantage is taken of the centrifugal force generated by the rotating blade and the slapping action of the curved buckets 66 and 67 as they eject snow through the discharge duct 23. Not only is the duct 23 of optimum size, but its walls are substantially parallel to the discharge path of the snow, a feature which provides a minimum amount of resistance to snow passage.

In Fig. 6, a modified form of the snow plow attachment of the present invention is disclosed. This modification comprises a rotary snow plow attachment 100 arranged to be attached to and driven from a one-wheeled garden tractor 102. It will be seen in Fig. 7, that the housing 104 of this attachment is substantially identical to the housing 17 illustrated in Fig. 3. An outlet duct 106 and a discharge opening 107 are provided which are proportioned and located to efficiently coact with a helical rotor 108 in the manner disclosed in connection with the snow plow attachment of Fig. 1. The rotor 108 has right and left hand flights adapted to move snow to the center of the housing for discharge through the opening 107. The bucket portion 109 of the rotor is slightly different from the bucket portion 67 of the rotor 28 in that the base section 109a of the U-shaped bucket portion 109 extends away from a tubular shaft 110 of the rotor in a radial direction substantially in a plane extending through the axis of the rotor shaft 110 whereas, as previously explained, the base sections 68 of the buckets 66 and 67 are substantially tangent to the tubular shaft 64.

A cutting blade 112 (Fig. 7) is disposed transversely of the housing 104 immediately below and slightly forwardly of the lower edge 113 of a U-shaped scoop 114. The blade 112 may be secured, in any suitable manner, to mounting straps 116, one of which is bolted to each side plate 117. The blade 112 is provided to scrape off packed-down snow and the like and direct it upwardly and rearwardly into the operating zone of the rotor 108.

The rotor 108 is driven by means of a chain drive 119 from a sprocket 120 keyed to a countershaft 121 (Fig. 8). The countershaft 121 is rotated through a belt 122 trained over a pulley 124 on the shaft 121 and a double grooved pulley 123 keyed to a power take-off shaft 125 of an engine 126. The tractor wheel 128 is driven through a suitable transmission (not shown) from a driven shaft 130 (Fig. 6) to which a pulley 131 is keyed. A belt 133, which is installed between the pulley 131 and the inner groove of the double groove pulley 123 on the power take-off shaft 125, transmits power from the engine to the wheel 128.

It has been found that the ability of the rotor 108, when rotating at a fixed speed, to efficiently scoop up snow, move it to the central discharge opening 107, and eject it therethrough, is dependent upon the thickness of the layer of snow and the forward speed of the tractor as it advances into the snow layer. The thinner the layer of snow, the faster the tractor may be moved forwardly for any given speed of rotation of the rotor. In Fig. 6 an arrangement of the drive mechanism is shown wherein the rotor will successfully handle layers of snow of four inches or over while the tractor moves forwardly with a ground speed of approximately one mile per hour. If the layer of snow to be removed is less than four inches, a higher tractor ground speed may be used for the same speed of rotation of the rotor. In Fig. 8, the means provided in the present invention to effect the change-over to the faster tractor ground speed is diagrammatically illustrated. In this new arrangement the belt 133 is removed from the pulleys 131 and 123 and a longer belt 140 is trained over the pulley 131 and a relatively small pulley 142 keyed to the countershaft 121. Therefore, the tractor drive shaft 130 is driven from the engine power take-off shaft 125 through the pulley 123, the belt 122, the pulley 124, the countershaft 121, the small pulley 142, the long belt 140 and the tractor drive pulley 131. Since the pulley 142 is smaller in diameter than the pulley 123, the tractor drive pulley 131 will be driven at a faster speed with this arrangement than when it is driven directly from the power take-off shaft pulley 123.

With the drive arrangement of Fig. 6, an idler pulley 145, mounted on a swinging lever (not shown) is positioned to be moved by the operator into the belt tightening engagement with the belt 133, in a manner similar to that explained in connection with idler pulley 82 of Fig. 4.

From the foregoing description, it will be seen that the snow plow of the present invention features a rotor having helical vanes constructed to efficiently move snow to the discharge opening of the housing, and a new type of curved ejector blade arranged to smoothly receive snow from the helical vanes and positively eject it through the discharge opening which is so constructed and arranged relative to the discharging position of the ejector blades that the snow passes smoothly in a substantially straight path into the duct without jamming or packing of the snow therein.

It will be understood that modifications and variations may be made without departing from the scope of the present invention.

Having thus described my invention, what I claim as my invention and desire to protect by Letters Patent is:

1. In a snow plow, the combination of a housing having an open forward side and a discharge opening in one wall, a helical screw rotatably mounted in said housing and arranged to receive snow through said open forward side and eject it through said discharge opening, a generally tubular discharge duct secured over said opening, a laterally projecting circular flange on the discharge end of said duct, a collar rotatably disposed over said flange having a circular portion overlying said flange and adjustable abutment members disposed under said flange, means for locking said collar in a selected rotated position relative to said duct including means for moving said abutment members into locking frictional engagement with the underside of said flange, a curved chute secured to and projecting generally upwardly from said collar, a curved chute extension disposed over said curved chute and having an elongated slot in one wall, and fastening means anchored in said chute and passing through said elongated slot and arranged to lock said curved extension in a selected adjusted position relative to said chute.

2. In a snow plow, the combination of a housing having an open forward side and a discharge opening in one wall, a helical screw rotatably mounted in said housing and arranged to receive snow through said open forward side and eject it through said discharge opening, a generally tubular discharge duct secured over said opening, a laterally projecting circular flange on the discharge end of said duct, a collar rotatably disposed over said flange having a circular portion overlying said flange and adjustable abutment members disposed under said flange, means for locking said collar in a selected rotated position relative to said duct including means for moving said abutment members into locking frictional engagement with the underside of said flange, and a curved chute secured to and projecting generally upwardly from said collar.

References Cited in the file of this patent

UNITED STATES PATENTS

| | | |
|---|---|---|
| 2,103,510 | Brown | Dec. 28, 1937 |
| 2,194,662 | Klauer | Mar. 26, 1940 |
| 2,200,623 | James | May 14, 1940 |
| 2,223,372 | Klauer | Dec. 3, 1940 |
| 2,315,007 | Morris et al. | Mar. 30, 1943 |
| 2,372,172 | Bevan | Mar. 27, 1945 |
| 2,387,423 | Venable | Oct. 23, 1945 |
| 2,642,680 | Curtis et al. | June 23, 1953 |
| 2,692,445 | Darnall | Oct. 26, 1954 |

FOREIGN PATENTS

| | | |
|---|---|---|
| 219,366 | Switzerland | May 16, 1942 |
| 224,578 | Switzerland | April 1, 1943 |

OTHER REFERENCES

"The Dragon," vol. XXXII, No. 5, February 1952, pp. 4, 5 and 11, Fafnir Bearing Co., New Britain, Conn.